(12) United States Patent
Deutsch et al.

(10) Patent No.: US 7,074,106 B1
(45) Date of Patent: Jul. 11, 2006

(54) LIGHTED TOY FOR PETS

(76) Inventors: Daniel Deutsch, P.O. Box 22623, Lake Buena Vista, FL (US) 32830; Jason Barber, P.O. Box 22023, Lake Buena Vista, FL (US) 32830; Russell Rothan, P.O. Box 22390, Lake Buena Vista, FL (US) 32830

( * ) Notice: Subject to any disclaimer, the term of this patent is extended or adjusted under 35 U.S.C. 154(b) by 391 days.

(21) Appl. No.: 10/691,233

(22) Filed: Oct. 22, 2003

Related U.S. Application Data

(60) Provisional application No. 60/420,297, filed on Oct. 22, 2002.

(51) Int. Cl.
*A63H 33/26* (2006.01)

(52) U.S. Cl. .................. 446/175; 446/438; 119/711

(58) Field of Classification Search ................ 119/702, 119/707, 711; 446/397, 404, 409, 484, 485, 446/175, 219, 438; 273/DIG. 20
See application file for complete search history.

(56) References Cited

U.S. PATENT DOCUMENTS

| | | | | |
|---|---|---|---|---|
| 2,086,631 A | * | 7/1937 | Munro | ...................... 119/711 |
| 4,002,893 A | * | 1/1977 | Newcomb et al. | .......... 473/570 |
| 5,575,240 A | * | 11/1996 | Udelle et al. | ................ 119/707 |
| 5,778,825 A | * | 7/1998 | Krietzmen et al. | ......... 119/708 |
| 5,797,353 A | * | 8/1998 | Leopold | ..................... 119/710 |
| 6,484,671 B1 | * | 11/2002 | Herrenbruck | ............... 119/707 |
| 6,557,496 B1 | * | 5/2003 | Herrenbruck | ............... 119/707 |
| 6,578,527 B1 | * | 6/2003 | Mathers | ...................... 119/707 |

* cited by examiner

*Primary Examiner*—Jacob K. Ackun, Jr.
(74) *Attorney, Agent, or Firm*—Allen, Dyer, Doppelt, Milbrath & Gilchrist, P.A.

(57) ABSTRACT

A toy comprises generally spherical translucent housing having an inner cavity and at least one opening positioned to provide an outlet from the inner cavity, a power source positioned within the housing, an electrical circuit connected to the power source, a light source connected to the power source through the electrical circuit, and a switch connected in the electrical circuit, wherein an amount of a scent-producing material is positioned in the inner cavity of the housing so as to release a scent through the outlet opening. Also included is an entertainment device including a housing having a cavity and at least one opening positioned to provide an outlet from the cavity, a power source, an electrical circuit, a stimulator selected from a light source, a sound source, and a combination thereof, the stimulator connected to the power source through the electrical circuit, and a switch connected in the electrical circuit.

13 Claims, 1 Drawing Sheet

LIGHTED TOY FOR PETS

RELATED APPLICATION

This application claims priority from provisional application Ser. No. 60/420,297, which was filed on Oct. 22, 2002, and which is incorporated herein by reference in its entirety.

FIELD OF THE INVENTION

The present invention relates to the field of devices for entertainment, or toys, and in a preferred embodiment more specifically to a playtoy catnip ball which lights up in response to movement of the ball.

BACKGROUND OF THE INVENTION

Domestic cats have been kept as household pets perhaps since as long ago as ancient Egyptian times. Cats continue to be exceedingly popular as house pets, particularly as they are smart, and highly independent animals, generally requiring a minimum of care by the owner. It is known, however, that is it sometimes necessary to keep a cat amused or otherwise occupied, so as to reduce the chances that the animal will turn its attention to furniture or breakable objects in the house.

Accordingly, many different toys have been developed to amuse and keep cats occupied. In that vein, the present invention provides a catnip ball which lights up in response to motion of the ball. The combination of catnip scent, ball movement, and light emitted from the ball provides nearly indefinite entertainment for a house cat.

Catnip, as known to cat enthusiasts, is an aromatic perennial herb (*Nepeta cataria*) which grows up to about 3 ft. tall. It is native to Europe and is naturalized to North America. Typically, catnip grows along dry roadsides and in mountainous regions up to about 5,000 ft. Catnip is harvested in summer and fall when in full flower. Catnip contains iridoids, tannins, and volatile oil comprising primarily alpha and beta-nepetalactone, citronellol, and geraniol. This herb is also used in human herbal medicine for treatment of a variety of conditions, including barrenness, to hasten delivery, to help expectoration, to settle the stomach especially in indigestion and/or colic, and is also thought useful in treating headaches brought on by digestive problems. Catnip is well known to cause excitation in cats.

SUMMARY OF THE INVENTION

With the foregoing in mind, in a preferred embodiment the present invention advantageously provides a toy comprising a generally spherical translucent housing having an inner cavity and at least one opening positioned to provide an outlet from the inner cavity. A power source is positioned within the housing, and an electrical circuit is connected to the power source. A light source is connected to the power source through the electrical circuit, the light source being preferably at least one light-emitting diode (LED). A switch is connected in the electrical circuit. In a preferred embodiment, a scent-producing material is positioned in the inner cavity, most preferably the scent-producing material being catnip. The toy is then particularly attractive to cats.

Another, broader, embodiment of the invention includes an entertainment device comprising a housing having a cavity and at least one opening positioned to provide an outlet from the cavity. The device includes a power source connected in an electrical circuit in the device, and a stimulator selected from a light source, a sound source, and a combination thereof, the stimulator also connected to the power source through the electrical circuit. A switch is connected in the electrical circuit to energize the device.

Additionally, the invention also includes methods of entertaining a subject by use of the described devices.

BRIEF DESCRIPTION OF THE DRAWINGS

Some of the features, advantages, and benefits of the present invention having been stated, others will become apparent as the description proceeds when taken in conjunction with the accompanying drawings, presented for solely for exemplary purposes and not with intent to limit the invention thereto, and in which.

DETAILED DESCRIPTION OF THE PREFERRED EMBODIMENT

The present invention will now be described more fully hereinafter with reference to the accompanying drawings, in which preferred embodiments of the invention are shown. Unless otherwise defined, technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including any definitions, will control. In addition, the materials, methods and examples given are illustrative in nature only and not intended to be limiting. Accordingly, this invention may be embodied in many different forms and should not be construed as limited to the illustrated embodiments set forth herein. Rather, these illustrated embodiments are provided solely for exemplary purposes so that this disclosure will be thorough and complete, and will fully convey the scope of the invention to those skilled in the art. Other features and advantages of the invention will be apparent from the following detailed description, and from the claims.

Figure 1:
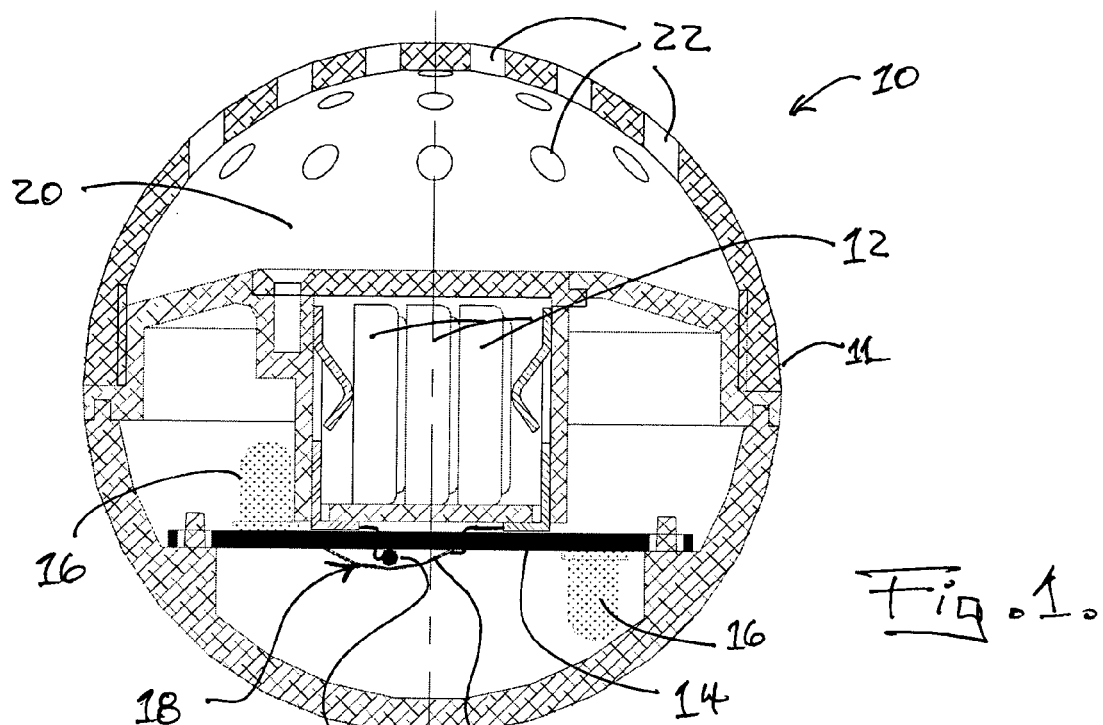
FIG. 1 is a cross sectional view along a diameter of the catnip ball according to an embodiment of the present invention.
Figure 2:
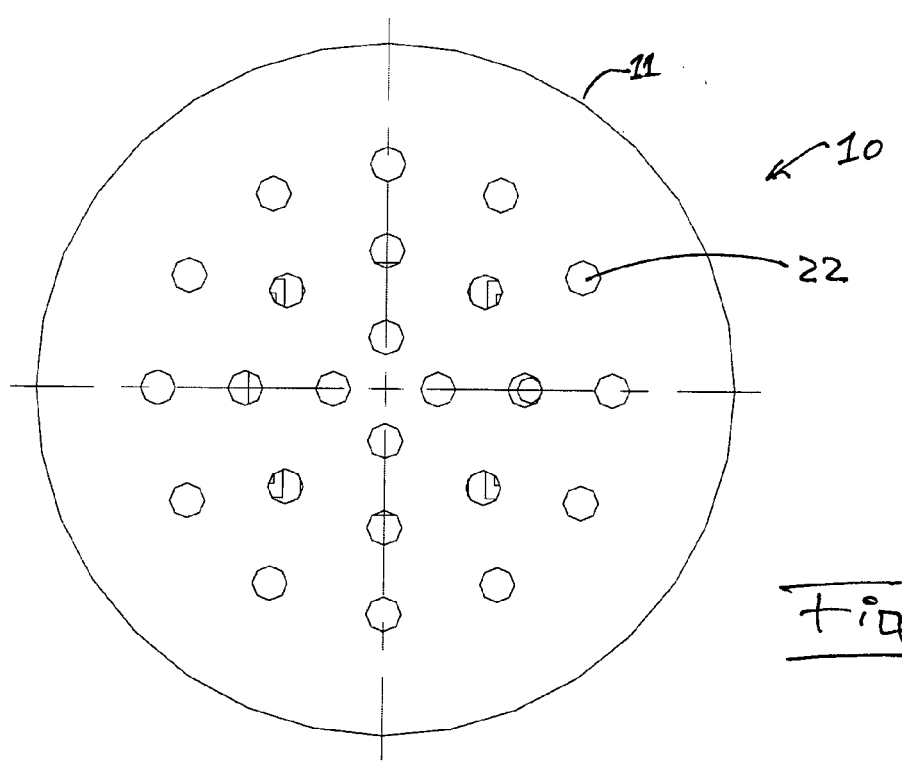
FIG. 2 is a top plan view of the catnip ball of FIG. 1.

A preferred embodiment of the present invention is a lighted catnip ball 10, as illustrated in FIGS. 1 and 2. The catnip ball comprises housing 11 in the shape of a hollow ball preferably made of a clear or translucent, impact resistant plastic material such as polycarbonate. The housing encloses a power source 12, an electrical circuit which is preferably an integrated circuit board 14, at least one light-emitting diode (LED) 16 as a light source, and a motion sensitive switch 18 connected to energize the LED in response to movement of the housing. In addition, the housing may be opened to access an inner compartment 20 for therein placing an amount of catnip, the compartment comprising a plurality of openings 22 along an adjacent outer surface of the housing, so as to let the scent of the catnip diffuse from the inner compartment to the ambient air.

It should be understood that, while a preferred embodiment of the invention is the catnip ball described, the invention may also be used with an appropriate scent-producing material other than catnip so that the ball may be attractive and entertaining for other pet animals or for people.

In the invention, most preferably the housing material comprises a fluorescent composition responsive to ultraviolet (UV) or near-ultraviolet light (nUV), and the at least one LED is an ultraviolet or near-ultraviolet emitting LED (UV-LED). Ultraviolet light is known to span the electromagnetic spectrum from about 320 to about 220 nm. Far-ultraviolet is in the range of about 220–280 nm. Middle-ultraviolet is in the range of about 280–320 nm. Near-ultraviolet is in the range of about 320–400 nm. LED technology has progressed recently, so that there are UV-LEDs now available which generate UV or nUV light. While the human eye cannot perceive UV, it can detect nUV as a purplish light, also known as "black light." It should be understood that the term "UV light" is used herein to include both ultraviolet and near-ultraviolet light, as well as any other radiation capable of exciting the fluorescent composition in the housing to fluoresce. A number of fluorescent compounds and compositions may be used in the invention, by way of non-limiting example, compositions of fluorescein isothiocyanate will fluoresce yellow-green, compositions of rhodamine will fluoresce in a reddish color, and compositions of calcofluor white will fluoresce in a bright yellow-white color.

While the presently described invention may be embodied in a catnip ball having one or more LEDs 16 which emit visible light, either white light, or varying colors, a most preferred embodiment of the invention includes one or more UV-LEDs 16 as light source, and a fluorescent plastic ball-shaped housing 11 which fluoresces when irradiated by UV, nUV light, or other appropriate wavelength. Such an embodiment produces a brighter, shining ball because the entire ball-shaped housing glows as the housing itself generates light by fluorescence, in addition to the light generated directly by the UV-LED.

A preferred embodiment of the invention is shown in FIGS. 1 and 2. In this embodiment, a motion sensitive switch 18 comprises a member 19 electrically connected to a pole of the power source 12. The member is positioned suspended adjacent a contact 17 electrically connected with the opposite pole of the power source 12. Movement of the housing 11 causes the member 19 to vibrate sufficiently to touch the contact 17, thereby closing the electrical circuit 14 and energizing the light source, unless there is yet another switch which must also be closed in the circuit. When movement ceases, vibration of the member is reduced and eventually stops, the member moves away from the contact, and the electrical circuit is opened, turning off the light source.

In this embodiment, the member could be a spring coil formed from a wire which is electrically connected to a pole of the power source. The vibrational characteristics of the switch depend on factors known in the art, such as the gauge of wire used to make the spring coil, the number of coils in the spring, the tensile strength of the wire and, therefore, its bendability. Careful control of such characteristics will allow fabrication of a switch of predetermined sensitivity to motion, and of predetermined residual contact after motion stops. An integrated circuit positioned on a circuit board may also be configured for controlling the rate at which the light source is energized. For example, the integrated circuit 14 can minimize the energizing of the light source due to random movement such as experienced during shipment. Additionally, the integrated circuit 14 could be configured to provide a low power use mode responsive to random movement of the wheel light, thereby helping conserve energy in the power source. The motion sensitive switch may also be a roller ball type of switch wherein a metallic bearing bridges two contacts to close the circuit as the ball rolls around. Most preferably, the lighted ball is balanced by appropriate placement of the power source 12 so that the center or gravity of the ball is positioned such that the ball always tends to stop with the motion sensitive switch oriented to the OFF position.

Those skilled in the art will understand that the described switch 18 preferably comprises an integrated circuit 14 providing functions related to controlling power flow to the light source 16. For example, the switch 18 may intermittently energize the light source 16 LEDs responsive to motion of the housing 11 to thereby create visual effects with the emitted light. In addition, intermittently energizing of the light source 16 may be accomplished at predetermined timed intervals to create further light effects. While a preferred switch is automatically responsive to movement of the device, the invention is also intended to include a switch manually operated by the user. The invention may additionally include, if desired, other switching mechanisms together with a primary switch, for example, a light sensor which prevents the light source from being energized in the presence of sufficient ambient light.

The skilled will no doubt appreciate that the concept of the invention may also be broadened to include an entertainment device comprising a housing having a cavity and at least one opening positioned to provide an outlet from the cavity, a power source, an electrical circuit connected to the power source, a stimulator selected from a light source, a sound source, and a combination thereof, the stimulator connected to the power source through the electrical circuit, and a switch connected in the electrical circuit. Of course the entertainment device may be expressed in many more embodiments than a simple toy ball wherein the housing is generally spherical so that the device rolls. While many of the features of the entertainment device embodiment of the invention are generally as described above, this embodiment preferably comprises a sound source which is a source of music. It should be understood that a source of music may not only include a microchip which generates sounds, but also any of various other music players, such as a compact-disc player, an audio casette player, a radio, and the like. In this embodiment, the invention may thus be broadened to include a mood-enhancing, home entertainment, decorative device, which is more than a toy. Further, this embodiment may include a motion sensor so that the switch is responsive to movement that occurs within range of the sensor. In the entertainment device embodiment, the scent-producing material may be a perfume or scented oil, rather than catnip or other animal attractant.

A method aspect of the present invention includes a method of entertaining a subject. The method comprises providing a device including a housing having a cavity positioned within the housing and at least one opening positioned to provide an outlet from the cavity, a power source, an electrical circuit connected to the power source, a stimulator connected in the electrical circuit, the stimulator selected from a light source, a sound source, and a combination thereof, a switch connected in the electrical circuit, and an amount of a scent-producing material positioned within the cavity of the housing so as to release scent through the outlet opening, andactivating the switch so as to energize the stimulator to thereby entertain the subject.

In the method, the switch is preferably automatically responsive to movement of the device. Also, the housing may be generally spherical so that the device consists of a rolling toy. As noted above, the cavity may comprise an inner cavity positioned within the housing. An additional feature of the method includes generating heat adjacent the cavity so as to promote diffusion of scent from the scent-producing material. The skilled will understand that the method is applicable to entertaining a subject which is a person, or a pet animal. Depending on the subject of the method, of course, the scent-producing material may be catnip or some other material attractive to the subject, for example, perfume or scented oil. A preferred light source in the method comprises a light-emitting diode and a source of sound comprises a source of music.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A toy comprising:
   a generally spherical translucent housing having an inner cavity and at least one opening positioned to provide an outlet from said inner cavity, the housing comprising a fluorescent composition responsive to UV light;
   a power source positioned within said housing;
   an electrical circuit connected to said power source;
   a light source connected to said power source through said electrical circuit, said light source capable of generating sufficient UV light for exciting the fluorescent composition to fluoresce; and
   a switch connected in said electrical circuit, wherein said switch is automatically responsive to movement of said toy.

2. The toy of claim 1, wherein said housing further comprises a plurality of openings positioned to provide outlets from said inner cavity.

3. The toy of claim 1, wherein said housing comprises two parts separable from each other to thereby provide access to the inner cavity.

4. The toy of claim 1, wherein the inner cavity in said housing is divided into at least first and second compartments.

5. The toy of claim 4, wherein said at least one opening provides an outlet from said first compartment.

6. The toy of claim 4, wherein said second compartment is substantially waterproof and houses said power source, electrical circuit, and light source.

7. The toy of claim 1, wherein said power source comprises at least one battery.

8. The toy of claim 1, further comprising a microchip having an integrated circuit wherein said electrical circuit is included.

9. The toy of claim 1, wherein said light source comprises a light-emitting diode.

10. The toy of claim 1, wherein said switch is positioned along an exterior surface of said housing so as to aid user access thereto.

11. The toy of claim 1, in combination with an amount of a scent-producing material positioned within the inner cavity of said housing so as to release scent through said outlet opening.

12. The toy of claim 11, wherein the scent-producing material comprises catnip.

13. The toy of claim 1, further comprising a sound source connected in said electrical circuit.

* * * * *